INVENTOR.
JESSE T. FERGUSON JR.

3,285,643
INTERCHANGEABLE STRUCTURAL JOINT

Jesse T. Ferguson, Jr., Nagoya, Japan, assignor, by mesne assignments, to the United States of America as represented by the Secretary of the Navy
Filed Apr. 13, 1964, Ser. No. 359,531
7 Claims. (Cl. 287—189.36)

This invention relates to structures and more particularly to an interchangeable structural joint that has a higher strength-to-weight capability.

In the assembly of structural components it is necessary to connect the parts together to form an integral assembly. In the assembly of the tubular components of a missile skin there are several important considerations, namely, that the joints have a high strength-to-weight ratio; that there is no "slop" in the joints that will cause failures or vibrations in flight; that the fastening devices be readily accessible from an exterior position; and that the joint does not require prohibitively close tolerances and machining, nor require selective fitting or drilling of mating holes during assembly. The joint of this invention achieves all of the above enumerated objectives which have not been available in prior art connections.

An important object of this invention is to provide an interchangeable joint having a higher strength-to-weight ratio.

Other objects are to provide a connection which is simple in construction; that does not require the machining of complex surfaces; and which does not require custom fitting.

Still another object is to provide such a joint which can be readily assembled or disconnected from an exterior position, and which will be free of protuberances that would otherwise disturb the aerodynamic surfaces.

Other objects, advantages and novel features of the invention will become apparent from the following detailed description of the invention when considered in conjunction with the accompanying drawings wherein.

Figure 2:
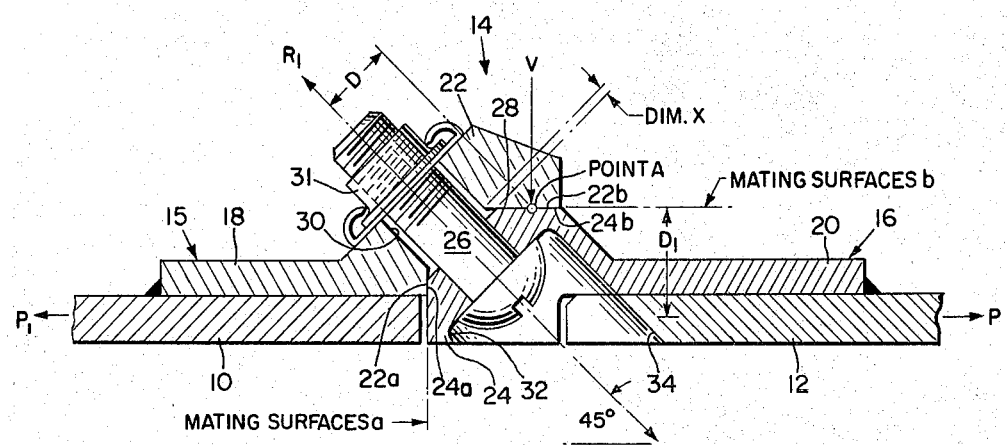
FIG. 2 is a cross-sectional view taken along line II—II of FIG. 1.
Figure 1:
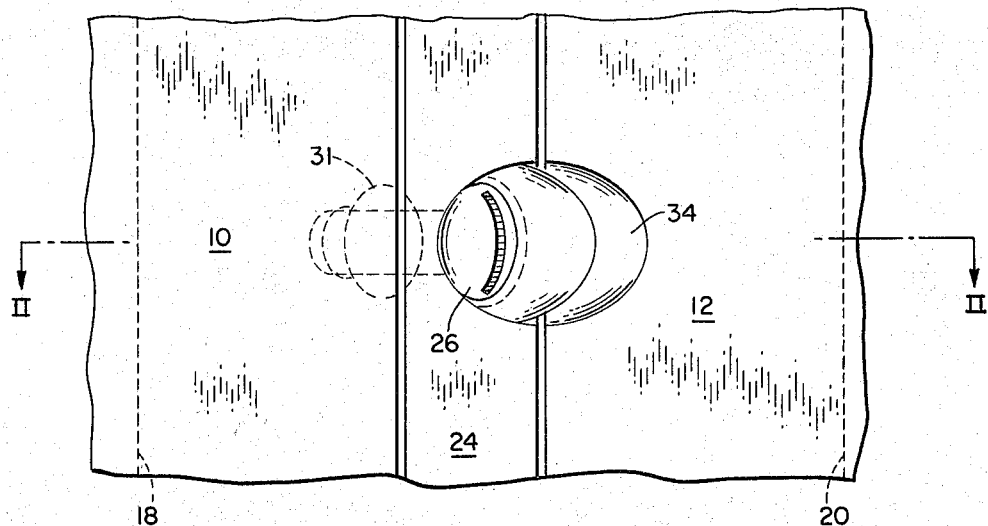
FIG. 1 is a top plan view of the novel interchangeable joint.

Referring to the drawing where like reference numerals refer to similar parts throughout the drawing there is shown in FIGS. 1 and 2, two structural elements 10 and 12 arranged in spaced-apart juxta-relation to one another and intended to be secured together by a joint 14. It is apparent that elements 10 and 12 can be flat plates, bars etc., or can be tubular in configuration, such as the skin of a missile or aircraft. It is only necessary that corresponding opposed terminal portions of the elements 10 and 12 be separated from one another so as to create a gap therebetween as shown in FIGS. 1 and 2 of the drawings. Joint 14 has a portion thereof lying in such gap, and this joint includes a pair of generally L-shaped lugs 15 and 16, which are adapted to mate with each other in a manner to be described. Each lug has a longitudinal leg 18 and 20 adapted to lie parallel to one side of the respective element, preferably the inside where a hollow aerodynamic article is involved, and be welded or otherwise secured thereto. Lugs 15 and 16 have off-set legs 22 and 24 formed integral with longitudinal legs 18 and 20, respectively.

Off-set leg 22 has a pair of machined bearing surfaces 22a and 22b formed normal to each other, the former surface lying in a plane transverse to elements 10 and 12, and the latter surface lying in a plane parallel thereto. Off-set leg 24 lies partially within the gap between the elements 10 and 12, as illustrated. This leg 24 is also provided with a pair of machined bearing surfaces 24a and 24b, disposed at right angles to each other and adapted to be complementary to and to contact surfaces 22a and 22b, respectively. For reference purposes, mating surfaces 22a and 24a will be referred to as mating surfaces a, while mating surfaces 22b and 24b will be referred to as mating surfaces b. Off-set leg 24 is adapted to project into the gap between elements 10 and 12 but slightly spaced from the end of element 10 to ensure that surfaces 22a and 24a are in contact. It should be noted that the complementary surfaces in each pair a and b should be parallel to each other.

Joint 14 is detachably secured together by a bolt 26 which extends through suitable drilled openings 28 and 30 in off-set legs 24 and 22, respectively, the openings being disposed, preferably, at a 45 degree inclination with a plane containing elements 10 and 12. A retention nut 31 is secured to the inside of off-set leg 22 whereby the joint can be given a predetermined preload from a manipulation position exterior the joint. Opening 30 in off-set leg 22 is preferably larger than the diameter of the bolt, a suitable amount being 1.16 times as large, avoiding custom drilling and fitting. Off-set leg 24 and an edge of element 12 is countersunk at 32 and 34, respectively, at a 45 degree inclination to facilitate attachment of bolt 26, and also to permit the head of the bolt to lie within the surface of elements 10 and 12 to avoid aerodynamic drag in the event that the joint is used in a missile environment.

It is important that the outer corner edge of off-set leg 24 be chamfered, or recessed from the inside corner of off-set leg 22, in other words, to provide a clearance at X, to allow full mating of surfaces a and b simultaneously and to provide a tight joint in both planes.

In order to appreciate how this joint achieves its increased strength-to-weight capacity some explanation of the forces on the joint in FIGS. 1 and 2 is desirable. The applied load P, which can be a tension or compression, is applied in a plane containing elements 10 and 12, P be shown as a tension load, and the reaction force being $P_1$ When bolt preload is exceeded $$R = \frac{p}{.707}$$

$$\Sigma F_{\text{Hor.}} = P - P_1 = 0 \tag{1}$$

$$\Sigma F_{\text{Ver.}} = (R \cdot .707) - V = 0 \tag{2}$$

$$\therefore V = .707 R = P \tag{3}$$

$$\Sigma PT \cdot A = (P \cdot D_1) - (R \cdot D) = 0 \tag{4}$$

$$P = .707 R$$

$$D = .707 D_1$$

$$\therefore (.707 R \cdot D_1) - (R \cdot .707 D_1) = 0 \tag{5}$$

Thus, it is apparent that the vector V times the coefficient of friction between the surfaces b, is a function of the applied load P, and directly adds to the joint strength which in practice tests has increased by 20 to 25%. The only variable is the coefficient of friction, which can be conservatively estimated in design analysis.

Saying this in another way, the joint 14 is stronger than the fastening force of bolt 26 by an additional retention force created by the frictional components of vectors V and P, depending on their direction.

The novel joint of this invention provides a multiplicity of advantages; namely, it represents a simple design with normal machining tolerances acceptable; the structural components are interchangeable with all attachments externally available, and most important a higher weight-to-strength ratio is achieved.

Obviously many modifications and variations of the present invention are possible in the light of the above teachings. It is therefore to be understood that within the scope of the appended claims the invention may be practiced otherwise than as specifically described.

I claim:

1. A joint for connecting together two elongated spaced-apart elements that are subject to a load force comprising:
   a pair of lugs respectively associated with said elements, each of said lugs being a separate and distinct component from the element with which it is associated;
   each lug of each pair having one leg adapted to be secured to its associated element, one lug of said pair having an additional leg projecting into the space between said elements;
   each of said lugs having at least one bearing surface, the said bearing surfaces of the two lugs being complementary and adapted to mate with each other;
   a fastening device connecting said lugs, said fastening device lying at least in part in the space between said elements;
   said fastening device being inclined with respect to the load and said bearing surfaces to provide a vector component forcing said bearing surfaces into engagement;
   whereby an additional force is created to resist the load force and thereby increase the joint strength.

2. A joint for connecting together two spaced-apart elements that are subject to a load force comprising:
   a pair of lugs respectively associated with said elements, each of said lugs being a separate and distinct component from the element with which it is associated;
   each lug of each pair having one leg adapted to be secured to its associated element and a second off-set leg, the off-set leg of one of said lugs projecting into the space between said elements;
   each of said off-set legs having at least one bearing surface, the said bearing surfaces of the two lugs being complementary and adapted to mate with each other;
   a fastening device extending through said off-set legs, and lying at least in part in the space between said elements;
   said fastening device being inclined with respect to the load force and bearing surfaces to provide a vector component forcing said bearing surfaces into engagement;
   whereby an additional force is created to resist the load force and thereby increase the joint strength.

3. The joint of claim 1 wherein each off-set leg has at least two bearing surfaces disposed normal to each other.

4. The joint of claim 1 wherein said fastening device is disposed at a 45 degree angle to the direction of elongation of said two elements.

5. A joint for connecting together two elements that are subject to a load force comprising:
   a pair of lugs respectively associated with said elements, each of said pair of lugs being a separate and distinct component from the element with which it is associated;
   each lug of said pair having one leg adapted to be secured to its associated element and a second off-set leg formed with an opening therein, the off-set leg of one of said lugs projecting into the space between said elements;
   each of said off-set legs having two bearing surfaces disposed normal to one another;
   one off-set leg adapted to nest within the other off-set leg so that the respective ones of said surfaces are in complementary engagement;
   a bolt extending through the openings in said off-set legs;
   the axis of said bolt being inclined with respect to the load and said bearing surfaces and at an angle of 45° to each of the two bearing surfaces of each leg of said pair to provide a vector component forcing said bearing surfaces into engagement;
   whereby an additional force is created to resist the load force and thereby increase the joint strength.

6. A joint for connecting two spaced-apart elements together that are subject to a load force comprising:
   a lug for each of said elements;
   each lug having one leg adapted to be secured to said element and having an off-set leg, the off-set leg of one of said lugs projecting into the space between said elements;
   each of said off-set legs having two bearing surfaces disposed at an angle of 90° to one another;
   one off-set leg adapted to nest within the other off-set leg so that the respective surfaces are in complementary engagement;
   each of said legs having aligned apertures extending therethrough with a longitudinal axis, each aperture lying intermediate the two bearing surfaces of that particular leg;
   a fastening device extending through said openings;
   said fastening device having a longitudinal axis inclined at an angle of 45° with respect both to the load and to each of said bearing surfaces to provide a vector component forcing said bearing surfaces into engagement;
   whereby an additional force is created to resist the load force and thereby increase the joint strength.

7. A joint for connecting together the ends of two spaced-apart elements that are subject to a load force comprising:
   a lug for each of said elements;
   each lug having one leg adapted to be secured to said element and having an off-set leg;
   one of said off-set legs projecting into the space between said elements, said one off-set leg being recessed below one surface of said elements;
   each of said off-set legs having a pair of bearing surfaces disposed substantially at right angles;
   one off-set leg adapted to nest within the other off-set leg with the respective complementary bearing surfaces in contact;
   each of said off-set legs having aligned apertures extending therethrough with a longitudinal axis disposed substantially at a 45° inclination with respect to the bearing surfaces;
   a bolt positionable in said apertures, the bolt head being housed in the recessed portion of said one off-set leg;
   one of said apertures being slightly larger than the diameter of the bolt to facilitate assembly;
   whereby tightening of the bolt will produce a vector component forcing said bearing surfaces into engagement creating an additional force to resist the load force and thereby increasing the joint strength.

References Cited by the Examiner

UNITED STATES PATENTS

| | | | |
|---|---|---|---|
| 1,157,469 | 10/1915 | Von Philp | 189—36 |
| 2,452,227 | 10/1948 | Dahlstrand | 189—36 |

FOREIGN PATENTS

| | | |
|---|---|---|
| 2,606 | 1910 | Great Britain. |

HARRISON R. MOSELEY, *Primary Examiner.*

A. I. BREIER, *Assistant Examiner.*